Figure 1:
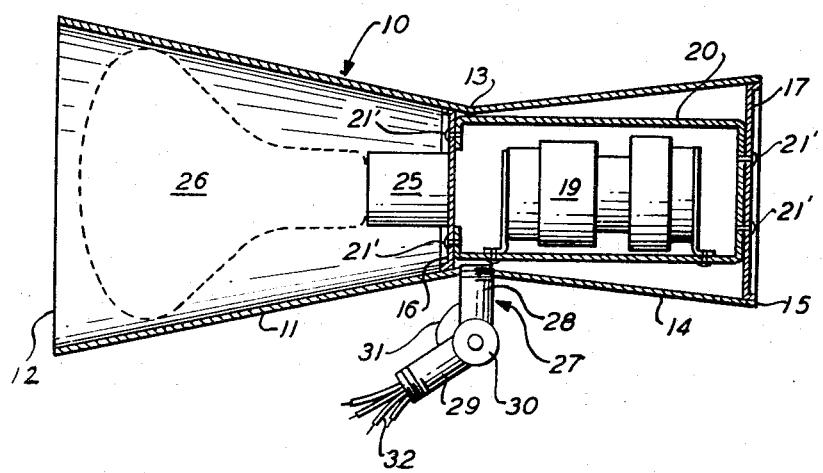

Feb. 20, 1968     H. C. PFAFF ET AL     3,370,160
FLOOD LIGHT FIXTURE
Filed June 23, 1966     3 Sheets-Sheet 1

INVENTORS
H. C. PFAFF
J. KEPENACH
BY ATTORNEY

Feb. 20, 1968  H. C. PFAFF ET AL  3,370,160

FLOOD LIGHT FIXTURE

Filed June 23, 1966  3 Sheets-Sheet 2

INVENTORS
H. C. PFAFF
J. KEPENACH

BY
ATTORNEY

Feb. 20, 1968 H. C. PFAFF ET AL 3,370,160

FLOOD LIGHT FIXTURE

Filed June 23, 1966 3 Sheets-Sheet 3

INVENTORS
H. C. PFAFF
J. KEPENACH

BY ATTORNEY

3,370,160
FLOOD LIGHT FIXTURE
Henry C. Pfaff, Summit, and John Kepenach, Middlesex, N.J., assignors to Pfaff and Kendall, Newark, N.J., a corporation of New Jersey
Filed June 23, 1966, Ser. No. 559,903
8 Claims. (Cl. 240—3)

This invention relates to a flood light fixture adapted to be adjustably secured to a lighting standard and comprising a housing of novel structural features, including sections reversely tapered from a point intermediate the length of the housing and novel means for mounting a reflector lamp and ballast bracket interiorly of the housing and for securing the housing adjustably to the lighting standard.

Unique features of construction, below more particularly described, and illustrated in the accompanying drawings, adapt the flood light housing of this invention to be manufactured in rugged, sturdy, standard production units, which, at the same time, are durable, effective and essentially foolproof in use, and versatile and adaptable for application to achieve custom or particular flood light effects desired.

The drawings, illustrating procedures and devices useful in carrying out the invention, and the description below, are exemplary only of the invention, which shall be deemed to cover all other devices and procedures coming within the scope and purview of the appended claims.

Figure 2:
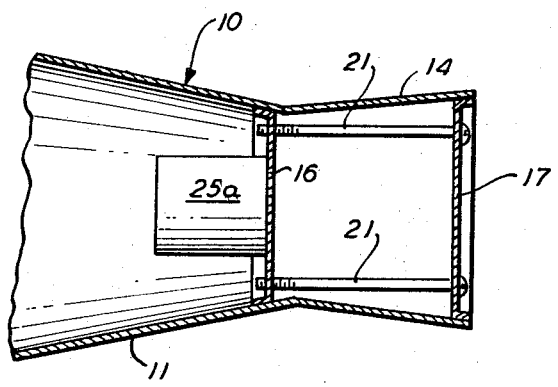
Figure 3:
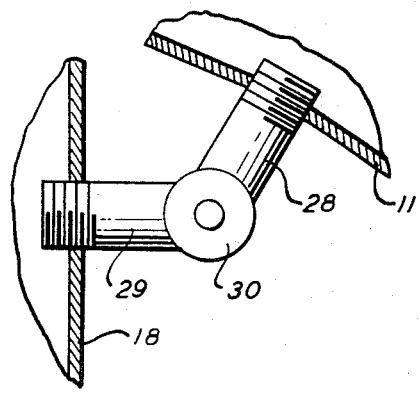
Figure 4:
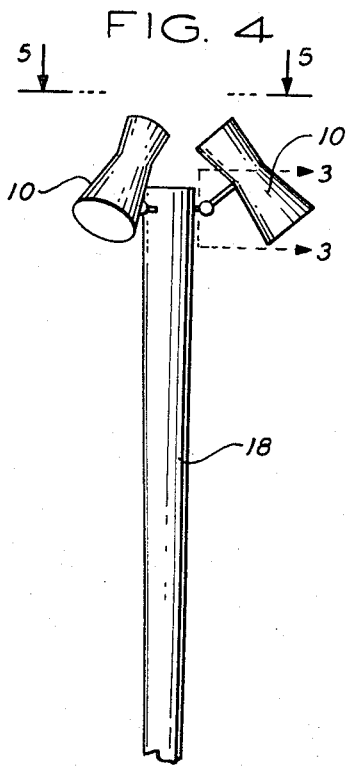
Figure 5:
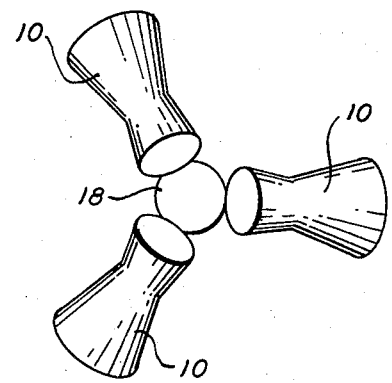
Figure 6:
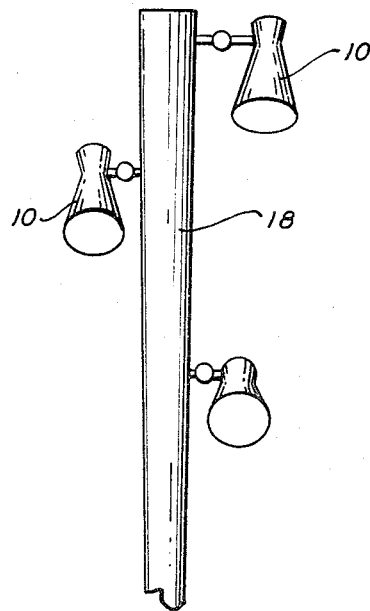
Figure 7:
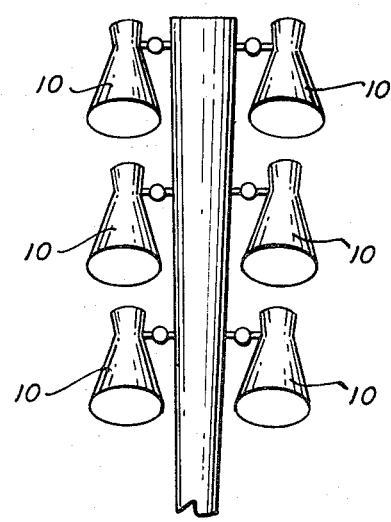
Figure 8:
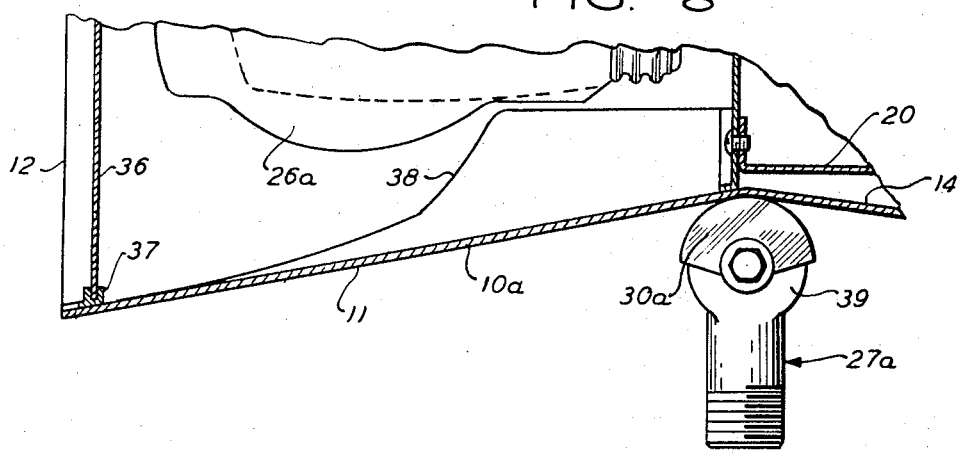
Figure 9:
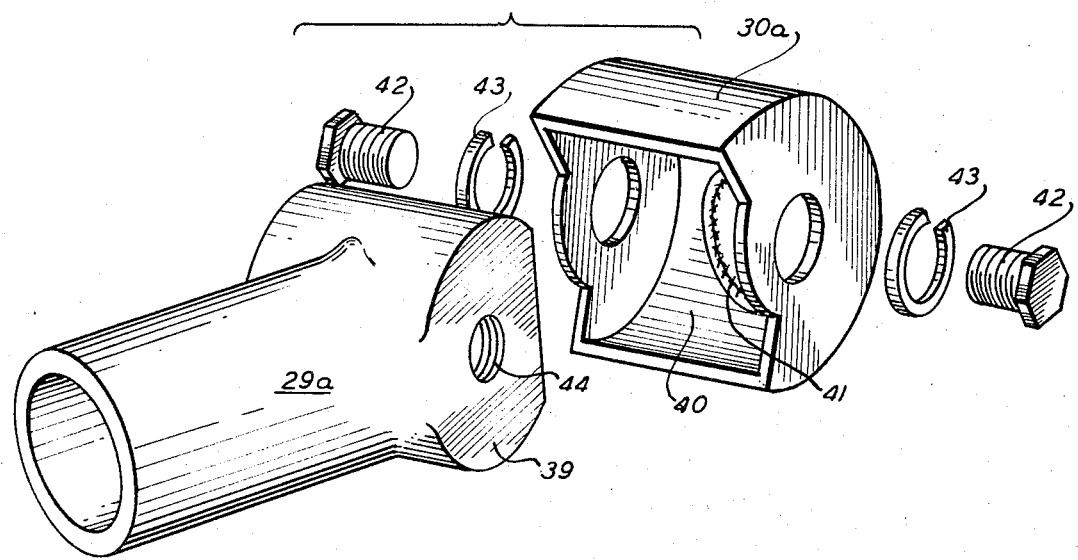

In the drawings, wherein similar reference characters indicate like parts:

FIG. 1 is a medial vertical sectional view of a flood light fixture embodying the invention, FIG. 2 is a fragmentary, medial, sectional view of a further form thereof, FIG. 3 is an enlarged, fragmentary, sectional view, taken at line 3—3 of FIG. 4, FIG. 4 is a side elevational view of a lighting standard provided with flood light fixtures of the invention, FIG. 5 is a top plan view thereof, taken at line 5—5 of FIG. 4, FIGS. 6 and 7 are side elevational views of further forms thereof, FIG. 8 is a fragmentary, partly sectional view of a further form thereof, and FIG. 9 is an exploded view of the adjustable fitting parts shown in FIG. 8.

As shown in the drawings, pursuant to the invention, an elongated housing 10 is formed (FIG. 1) with a first section 11, tapered inwardly from one end 12 of the housing, and a second section 14 tapered inwardly of the other end 15 of the housing to intermediate point 13, thereby defining sections 11, 14 of the housing reversely tapered outwardly of said intermediate point 13. The first section 11, is preferably of greater length than the second section and has an end portion of larger diameter than the second section.

A first end cap 16 is adapted to be positioned within the housing first section and proportioned for abutting engagement therewith, preferably adjacent the intermediate point 13; a second end cap 17 is positioned within the housing second section 14 and proportioned to have abutting engagement therewith, preferably adjacent the outer end 15 of the second section. Means are provided for drawing the end caps toward each other and into tight abutting relation with the first and second sections.

As shown in FIG. 2, when the ballast element (as 19, FIG. 1) is either mounted in the lighting standard or is not required for the type of lamp used with a flood light fixture, the means for drawing the end caps together may comprise bolt members 21, passing through one of the end caps 17 and threadedly or otherwise engaging the other end cap.

In the form shown in FIG. 1, ballast 19 is mounted on a ballast bracket 20 positioned in the second section 14 intermediate the end caps, short bolts 21′ engaging the end caps 16, 17, and the ballast bracket to draw the end caps together as above noted, and into abutting relation with the reversely tapered interiors of sections 11, 14 of the housing. As shown in the drawings, the end caps 16, 17 are plates with marginal flanges proportioned to so abut and engage the interiors of the first and second portions in progressively tighter relation on tightening the bolts. A lamp socket 25 may (FIG. 1) be secured to the end cap 16, for supporting a reflector lamp 26 within the first section 11. As shown in FIG. 2, a lamp socket 25a may be secured to end cap 16 for supporting a lamp in the first section.

Housing 10 may be adjustably secured to a lighting standard such as shown at 18 in FIGS. 4, 6, 7 by suitable means such as by an adjustable fitting 27 (FIG. 1) which may (FIGS. 1 and 2) have an arm member 28 threadedly or otherwise secured to the housing; a second arm member 29 is adjustably connected by swivel connection 30 to arm member 28, in an arrangement such that relative angular orientation thereof will dispose the housing on the light standard 18 in the desired position to focus the light at a desired point forwardly of or in line with the first section 11. The adjustable fitting 27 serves as a means for angularly mounting the housing 10 at the precise angle desired for the particular lighting effect to be achieved and also as a conduit for wires (32) for connection of the lamp 26 with a current source.

Corresponding parts are similarly marked in FIGS. 1–7 and in FIGS. 8–9 are marked with the suffix "a" following the same prime reference numbers.

The fixture housings are (FIGS. 4–7) adapted to be positioned in clusters, a plurality of lighting housings being mounted on the lighting standard 18 in such arrangement as is suited for the particular flood light effects to be achieved. For example (FIG. 5) the housings may be disposed 120° apart in parallel arrangement (FIG. 7) or staggered or stepped as FIG. 6, or in such other arrangement as may be desired, the particular arrangements of the clusters of housings shown in FIGS. 4, 6 and 7 being illustrative only, and not limitative.

The lighting standard 18 may be secured to a supporting surface in a manner well known to those skilled in this art for disposing it in a generally perpendicular or other desired angular arrangement.

FIG. 8 illustrates another form of lighting unit which may be incorporated in the first section 11, comprising a tempered glass lens 36 in a gasket 37 and a parabolic reflector 38 for mercury vapor lamp 26a.

As shown in FIGS. 8 and 9, second arm member 29a may be provided with swivel means comprising a circularly formed extension 39 for swivel connection with swivel member 30a which, however, in the form shown in FIGS. 8 and 9, does not connect the second arm, such as shown at 28 in FIG. 1, to the housing 10, but is directly connected thereto, as, for example, by internally welding the interior 40 thereof directly to the housing 10, along aperture 41 which provides an edge surface to facilitate welding (FIG. 9), to housing 10a as will be apparent to those skilled in this art. The swivel connection 30a comprises a semi-circular open shell, suitable pivot bolts 42 passing through apertures in swivel connection 30a and threaded in internally threaded portions 44 formed in extension 39 of the second arm 29. Lock washers 43 are provided so that, on assembly of the parts as above noted, by tightening the bolts 42, the parts may be locked in precisely the desired relative position.

While the foregoing disclosure of exemplary embodiments is made in accordance with the patent statutes, it is to be understood that the invention is not limited thereto or thereby, the inventive scope being defined in the appended claims.

We claim:

1. A floodlight fixture comprising an elongated hollow housing having a first section tapered inwardly of one end of the housing to a point intermediate the length of the housing, and a second section tapered inwardly from the other end of the housing to said intermediate point, thereby defining a housing with sections reversely tapered outwardly of said intermediate point, a first end cap adapted to be positioned within the housing first section and proportioned to have abutting engagement with the first section thereof, and a second end cap adapted to be positioned within the housing second section and proportioned to have abutting engagement with said second section, a lamp socket secured to said first end cap, and means engaging the end caps to draw them toward each other and thereby into tight abutting relation with the tapered interior walls of the first and second sections, assembling the same within the housing, and thereby holding the lamp socket therein.

2. In a flood light fixture as set forth in claim 1, said first section being of greater length than the second section and having an end portion of larger diameter than the second section, said sections tapering outwardly from said intermediate point.

3. In a flood light fixture as set forth in claim 1, a ballast bracket positioned within the second section intermediate the caps, said means so engaging the end caps also engaging the intermediate bracket, to so draw the end caps toward each other and into abutment with the housing.

4. In a flood light fixture as set forth in claim 1, said first cap so abutting the first section adjacent said intermediate point and said second cap so abutting said second section adjacent the outer end of the second section.

5. In a flood light fixture as set forth in claim 1, a fitting secured to the housing for adjustably connecting it to a lighting standard.

6. In a flood light fixture as set forth in claim 1, said end caps being plates and flanged marginal edges on said plates for so abutting the housing.

7. In a flood light fixture as set forth in claim 1, a fitting secured to the housing for adjustably connecting it to a lighting standard, said fitting comprising a first arm member secured to the housing and a second arm member adapted to be angularly adjustably secured to the first arm member at one end and to be secured to the lighting standard to thus secure the fixture thereto.

8. In a flood light fixture as set forth in claim 1, a fitting secured to the housing for adjustably connecting it to a lighting standard, said fitting comprising a swivel shell secured to the housing and swively receiving a complementarily formed portion formed end of the second arm member.

References Cited

UNITED STATES PATENTS

| 3,149,785 | 9/1964 | Appleton | 240—3 |
| 3,188,460 | 6/1965 | Thorsen | 240—52 |
| 3,210,531 | 10/1965 | Neely | 240—3 |

FOREIGN PATENTS 943,125  11/1963  Great Britain.

NORTON ANSHER, *Primary Examiner.*

J. W. PRICE, *Assistant Examiner.*